(12) United States Patent
Choi et al.

(10) Patent No.: US 9,080,079 B2
(45) Date of Patent: Jul. 14, 2015

(54) SLURRY FOR CHEMICAL MECHANICAL POLISHING

(75) Inventors: Eun-Mi Choi, Daejeon (KR);
Dong-Mok Shin, Daejeon (KR);
Seung-Beom Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 57 days.

(21) Appl. No.: 13/260,239

(22) PCT Filed: Apr. 22, 2010

(86) PCT No.: PCT/KR2010/002537
§ 371 (c)(1),
(2), (4) Date: Dec. 22, 2011

(87) PCT Pub. No.: WO2010/123300
PCT Pub. Date: Oct. 28, 2010

(65) Prior Publication Data
US 2012/0094490 A1    Apr. 19, 2012

(30) Foreign Application Priority Data

Apr. 22, 2009  (KR) .......................... 10-2009-0035051

(51) Int. Cl.
| | |
|---|---|
| C09K 13/00 | (2006.01) |
| C09G 1/02 | (2006.01) |
| C23F 1/16 | (2006.01) |
| C23F 1/18 | (2006.01) |

(52) U.S. Cl.
CPC ... *C09G 1/02* (2013.01); *C23F 1/16* (2013.01); *C23F 1/18* (2013.01)

(58) Field of Classification Search
CPC ................ C23F 1/10; C23F 1/14; C23F 1/34; C23F 1/18; C23F 1/42; C23F 1/16; C23F 1/32; C09K 13/06; H01L 21/30625; H01L 21/3212
USPC .............. 252/79.1, 79.2, 79.3, 79.4; 438/691, 438/692, 693; 216/103, 106
See application file for complete search history.

(56) References Cited

U.S. PATENT DOCUMENTS

| | | | |
|---|---|---|---|
| 6,369,019 B1* | 4/2002 | Gordon et al. ................ 510/421 |
| 6,936,543 B2* | 8/2005 | Schroeder et al. ............ 438/692 |
| 2003/0051413 A1* | 3/2003 | Sakai et al. ...................... 51/307 |
| 2003/0228763 A1* | 12/2003 | Schroeder et al. ............ 438/691 |
| 2004/0249086 A1* | 12/2004 | Boaen et al. .................. 525/383 |
| 2005/0130428 A1 | 6/2005 | Choi et al. |
| 2006/0014390 A1 | 1/2006 | Lee et al. |
| 2006/0076317 A1* | 4/2006 | De Rege Thesauro et al. . 216/88 |
| 2006/0226126 A1 | 10/2006 | Zhou et al. |

(Continued)

FOREIGN PATENT DOCUMENTS

| | | |
|---|---|---|
| CN | 1621469 A | 6/2005 |
| CN | 1699444 A | 11/2005 |

(Continued)

*Primary Examiner* — Lan Vinh
(74) *Attorney, Agent, or Firm* — Rothwell, Figg, Ernst & Manbeck, P.C.

(57) ABSTRACT

The present invention relates to a slurry for chemical mechanical polishing, comprising an abrasive; an oxidant; an organic acid; and a polymeric additive comprising polyolefin-polyalkyleneoxide copolymer, wherein the polyolefin-polyalkyleneoxide copolymer comprises a polyolefin repeat unit and two or more polyalkyleneoxide repeat units, and at least one polyalkyleneoxide repeat unit is branched.

20 Claims, 2 Drawing Sheets

(56) References Cited

U.S. PATENT DOCUMENTS

| | | |
|---|---|---|
| 2007/0077865 A1 | 4/2007 | Dysard et al. |
| 2007/0175104 A1* | 8/2007 | Nishiyama et al. ............ 51/307 |
| 2008/0045016 A1 | 2/2008 | Andou et al. |
| 2008/0085602 A1 | 4/2008 | Seong et al. |
| 2008/0148649 A1 | 6/2008 | Liu |

FOREIGN PATENT DOCUMENTS

| | | |
|---|---|---|
| CN | 1784513 A | 6/2006 |
| CN | 1800254 A | 7/2006 |
| CN | 1800284 A | 7/2006 |
| CN | 1813038 A | 8/2006 |
| CN | 101184817 A | 5/2008 |
| JP | 01-243433 | 9/1989 |
| JP | 2006-502579 A | 1/2006 |
| KR | 10-2003-0050026 A | 6/2003 |
| KR | 10-0466422 B1 | 1/2005 |
| KR | 10-0611064 B1 | 8/2006 |
| KR | 10-0829594 B1 | 5/2008 |
| WO | 2008057593 A1 | 5/2008 |

* cited by examiner

SLURRY FOR CHEMICAL MECHANICAL POLISHING

CROSS REFERENCE TO RELATED APPLICATION

The present application claims priority to and the benefit of Korean patent application No. 2009-0035051 filed in the Korea Intellectual Property Office on Apr. 22, 2009, the entire content of which is incorporated hereinto by reference.

BACKGROUND OF THE INVENTION (a) Field of the Invention

The present invention relates to a slurry for chemical mechanical polishing (CMP), and a chemical mechanical polishing method using the same. And more particularly, the present invention relates to a slurry for chemical mechanical polishing that can show good polishing rate to the target layer and has a high polishing selectivity, and particularly minimizes dishing, overpolishing to the target layer, and can maintain superior surface condition of the target layer after polishing, and a chemical mechanical polishing method.

(b) Description of the Related Art

High integration and high performance of a semiconductor device have continuously been required. Particularly, it is necessarily required to form a multi-layered wiring structure in order to achieve the high performance of the semiconductor device, and a planarization of each wiring layer is required in order to form the multi-layered wiring structure.

From the past, various methods including a reflow, a spin-on-glass (SOG) or an etchback, and the like have been used for the planarization of the wiring layer; however, these methods did not show satisfactory results according to the forming of the multi-layered wiring structure. On this account, chemical mechanical polishing (CMP) methods are widely applied for the planarization of the wiring layer, recently.

The CMP method is a method of contacting a polishing pad with a wiring layer and moving them relatively (for example, rotating a substrate on which the wiring layer is formed) while providing a slurry including abrasive and various chemical constituents between the polishing pad of a polishing device and the substrate on which the wiring layer is formed, so as to polish the wiring layer chemically by the action of the chemical constituents while mechanically polishing the wiring layer with the abrasive.

Recently, in order to further decrease resistance of the wiring layer and achieve high performance of a semiconductor device, there is a tendency to form the wiring layer with copper having low resistance. The polishing and planarization of the copper wiring layer by CMP method are generally performed as follows.

First, after forming an insulating layer such as a silicon oxide layer and a polishing stop layer, a copper wiring layer is formed on the polishing stop layer. At this time, the thickness of the copper wiring layer to be polished is defined by the polishing stop layer, and the copper wiring layer is planarized by removing the copper wiring layer formed on the polishing stop layer by polishing.

After forming the copper wiring layer, polishing and planarization are conducted by 2-steps CMP method. In the primary polishing step, most of the copper wiring layer on the polishing stop layer is removed, and the primary polishing is stopped when the upper surface of the polishing stop layer is exposed. Then, in the secondary polishing step, the surfaces of the polishing stop layer of which upper surface is exposed, the insulating layer and the copper wiring layer are finely polished to control fine uniformity and roughness of the copper wiring layer and remove dishing or erosion generated in the primary polishing step, thereby obtaining a planarized copper wiring layer. At this time, dishing or erosion refers to a phenomenon that a part of the copper wiring layer or the insulating layer is removed at a part that should not be removed by polishing to generate a depressed part on the polishing surface. The dishing or erosion may deteriorate electrical property of the copper wiring layer, etc.

In the above explained polishing and planarization method of the copper wiring layer, most of the copper wiring layer on the polishing stop layer is removed in the primary polishing step, and the polishing should be stopped when the upper surface of the polishing stop layer is exposed so as to prevent damage to the insulating layer, etc. Thus, a slurry used in the primary polishing step is required to have high polishing rate to the copper wiring layer and low polishing rate to the polishing stop layer to show excellent polishing selectivity to the copper wiring layer against the polishing stop layer, and not to generate much dishing or erosion that may cause deterioration of electrical property of the polished copper wiring layer.

SUMMARY OF THE INVENTION

It is an aspect of the present invention to provide a slurry for chemical mechanical polishing (CMP) that can maintain good polishing rate to the target layer and has a high polishing selectivity to the target layer against the other layers, particularly minimizes dishing, overpolishing to the target layer, and can maintain superior surface condition of the target layer after polishing, It is another aspect of the present invention to provide a chemical mechanical polishing method (CMP method) using the slurry.

The present invention provides a slurry for chemical mechanical polishing (CMP), comprising an abrasive; an oxidant; an organic acid; and a polymeric additive comprising polyolefin-polyalkyleneoxide copolymer, wherein the polyolefin-polyalkyleneoxide copolymer comprises a polyolefin repeat unit and two or more polyalkyleneoxide repeat units, and at least one polyalkyleneoxide repeat unit is branched.

The present invention also provides a chemical mechanical polishing method comprising: contacting a polishing pad with a copper-containing layer on a substrate; and moving them relative to each other while providing the slurry between the copper-containing layer on the substrate and the polishing pad to polish the copper-containing layer.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE EMBODIMENTS

Hereinafter, a slurry for chemical mechanical polishing and a chemical mechanical polishing method according to embodiments of the invention are explained in detail.

According to one embodiment of the invention, provided is a slurry for chemical mechanical polishing (CMP), comprising an abrasive; an oxidant; an organic acid; and a polymeric additive comprising polyolefin-polyalkyleneoxide copolymer, wherein the polyolefin-polyalkyleneoxide copolymer comprises a polyolefin repeat unit and two or more polyalkyleneoxide repeat units, and at least one polyalkyleneoxide repeat unit is branched.

Since the slurry for CMP comprises an abrasive, an oxidant, and an organic acid, it has high polishing rate to the target layer, for example a copper-containing layer such as a copper wiring layer, and low polishing rate to a tantalum-containing layer (for example, tantalum nitride layer) that is used as a polishing stop layer when polishing a copper wiring layer or an insulating layer such as silicon oxide layer, thus having high polishing selectivity to the copper layer against the tantalum layer or silicon oxide layer (i.e., the polishing rates between a copper-containing layer and tantalum-containing layer is about 30:1 or more, and the polishing rate between a copper-containing layer and a silicon oxide layer is about 50:1 or more). Therefore, when the slurry is applied for CMP of a target layer such as a copper wiring layer, it can rapidly and selectively remove the target layer.

And, as results of the experiments of the inventors, it was found that when a CMP slurry comprising polyolefin-polyalkyleneoxide copolymer comprising a polyolefin repeat unit and two or more polyalkyleneoxide repeat units, at least one polyalkyleneoxide repeat unit being branched, is used, dishing of a wiring layer comprising a copper-containing layer can be minimized. It appears that the polyolefin-polyalkyleneoxide copolymer acts as a wetting agent to enable the CMP slurry to be uniformly dispersed and penetrated over a large area within a wafer.

Accordingly, the slurry for CMP can show more improved WIWNU (Within Wafer Non-Uniformity) while showing high polishing rate and excellent polishing selectivity to a target layer, and it can largely reduce dishing generated by unnecessary removal of the target layer, for example, a copper wiring layer at the edge of a wafer, thus enabling manufacture of semiconductor devices having more improved properties.

Therefore, the slurry for CMP can be preferably used for CMP of a copper wiring layer of a semiconductor device and the like.

Meanwhile, the polyolefin-polyalkyleneoxide copolymer can be selected without limitation of the composition, as long as it comprises a polyolefin repeat unit and two or more polyalkyleneoxide repeat units, and at least one polyalkyleneoxide repeat unit is branched. Preferably, the polyolefin-polyalkyleneoxide copolymer may be represented by the following Chemical Formula 1, Chemical Formula 2, or Chemical Formula 3.

Chemical Formula 1

Chemical Formula 2

Chemical Formula 3 wherein, $R_1$, $R_2$, $R_{11}$, $R_{12}$, $R_{19}$, and $R_{20}$ are independently H or methyl; one of $R_3$ and $R_4$ is H, and the other is H or methyl; one of $R_5$ and $R_6$ is H, and the other is H or methyl; one of $R_7$ and $R_8$ is H, and the other is H or methyl; one of $R_9$ and $R_{10}$ is H, and the other is H or methyl; one of $R_{13}$ and $R_{14}$ is H, and the other is H or methyl; one of $R_{15}$ and $R_{16}$ is H, and the other is H or methyl; one of $R_{17}$ and $R_{18}$ is H, and the other is H or methyl; one of $R_{21}$ and $R_{22}$ is H, and the other is H or methyl; one of $R_{23}$ and $R_{24}$ is H, and the other is H or methyl; l, l', and l" are independently an integer of from 4 to 100; m, m', and m" are independently are an integer of from 4 to 250; n, n' and n" are independently are an integer of from 4 to 250; o and o' are independently an integer of from 4 to 250; and p is an integer of from 4 to 250.

The polymeric additive of the polyolefin-polyalkyleneoxide copolymer represented by the Chemical Formula 1, 2 or 3 enables the CMP slurry to be uniformly dispersed and penetrated over a large area within a wafer. Thus, a slurry for CMP comprising a polymeric additive of the polyolefin-polyalkyleneoxide copolymer represented by the Chemical Formula 1, 2 or 3 can remove a target layer rapidly and selectively, and minimize dishing, i.e., overpolishing of a target layer, for example, a copper-containing layer such as a copper wiring layer.

The polyolefin-polyalkyleneoxide copolymer has a hydrophobic part and a hydrophilic part, and the hydrophobic part is polyolefin repeat unit and the hydrophilic part is polyalkyleneoxide repeat unit. Preferably the polyolefin repeat unit, although its composition is not limited, may be a polyethylene repeat unit or a polyethylene-propylene copolymer repeat unit with a molecular weight of about 100 to 2000. More preferably, it may be a polyethylene repeat unit or a polyethylene-propylene copolymer repeat unit with a molecular weight of about 200 to 1500, most preferably a polyethylene repeat unit or a polyethylene-propylene copolymer repeat unit with a molecular weight of about 500 to 1200. If the molecular weight is measured on the basis of number average molecular weight, the polyolefin repeat unit may be a polyethylene repeat unit or a polyethylene-propylene copolymer repeat unit with a number average molecular weight of about 100 to 2,000, more preferably a polyethylene repeat unit or a polyethylene-propylene copolymer repeat unit with a number average molecular weight of about 200 to 1,500, most preferably a polyethylene repeat unit or a polyethylene-propylene copolymer repeat unit with a number average molecular weight of about 500 to 1,200. If the polyolefin repeat unit that is a hydrophobic part is composed of a polyethylene repeat unit or a polyethylene-propylene copolymer repeat unit with a molecular weight of about 100 to 2000, dispersion and penetration of the polyolefin-polyalkyleneoxide copolymer of the aqueous slurry for CMP in a wafer can be further improved. If the molecular weight of the polyolefin repeat unit is less than 100, the effect of adding a polymeric additive may be insignificant, and if it exceeds 2000, solubility of the polymeric additive in water may decrease when making up a slurry, thus inappropriate for use as an abrasive.

Hereinafter, each constituent of the slurry for CMP is explained in more detail.

The slurry for CMP comprises an abrasive for mechanical polishing of the target layer. Common abrasive those have been used to the slurry for CMP may be used without specific limitations, and for example, an inorganic abrasive such as a metal oxide abrasive, a resin-based abrasive, or an organic-inorganic complex abrasive may be used.

For example, a silica abrasive, an alumina abrasive, a ceria abrasive, a zirconia abrasive, or a titania abrasive may be used as the metal oxide abrasive, and two or more kinds of abrasive selected therefrom may be used. Furthermore, the metal oxide abrasive prepared by any method, such as a fuming method, a sol-gel method, and the like may be used without specific limitations.

Furthermore, styrene-based polymer abrasive such as polystyrene or styrene-based copolymer, acryl-based polymer abrasive such as polymethacrylate, acryl-based copolymer or methacrylate-based copolymer, polyvinylchloride abrasive, polyamide abrasive, polycarbonate abrasive, polyimide abrasive, and the like may be used without specific limitations as the resin-based abrasive, and spherical abrasive having a core/shell structure or single abrasive of the polymer selected from the above may be used without limitations in their shape. Furthermore, the polymer abrasive obtained by any method such as an emulsion polymerization or a suspension polymerization may be used as the resin-based abrasive.

Furthermore, it is needless to say that the organic-inorganic complex abrasive formed by compounding the organic materials such as the polymers, and the inorganic materials such as the metal oxides, can be also used as the abrasive.

However, it is preferable to use the silica abrasive as the abrasive in terms of polishing rate or polishing speed to the target layer such as a copper wiring layer or the appropriate surface protection.

Furthermore, the abrasive may have an average diameter of 10 to 500 nm considering the appropriate polishing speed to the target layer and dispersion stability in the slurry. For example, the average diameter of primary particles of the abrasive may be about 10 to 200 nm, and preferably about 10 to 100 nm, more preferably about 10 to 80 nm, measured by SEM, when the metal oxide abrasive is used, and the average diameter of primary particles of the abrasive may be about 10 to 500 nm, and preferably about 50 to 300 nm, more preferably about 100 to 200 nm when the organic abrasive is used. If the size of the abrasive becomes too small, the polishing speed to the target layer may decrease, and, on the contrary, if the size becomes too large, the dispersion stability of the abrasive in the slurry may decrease.

The abrasive may be comprised in the slurry for CMP in the content of about 0.1 to 30 wt %, preferably about 0.5 to 10 wt %, more preferably about 0.1 to 5 wt %. If the content of the abrasive is too low, polishing may be insufficient, and if it exceeds 30 wt %, dispersion stability of the abrasive in slurry is decreased.

Furthermore, the slurry for CMP comprises an oxidant. The oxidant forms an oxide film by oxidizing the target layer such as a copper wiring layer, and the polishing process of CMP method is performed to the target layer by eliminating the oxide film by physical and chemical polishing process.

Common oxidants those have been used to the slurry for CMP may be unlimitedly used as the oxidant, and for examples, an organic peroxide-based compound such as hydrogen peroxide, peracetic acid, perbenzoic acid, tert-butylhydroperoxide, and the like; ammonium persulfate (APS), potassium persulfate (KPS), hypochlorous acid, potassium permanganate, iron nitrate, potassium ferricyanide, potassium periodate, sodium hypochlorite, vanadium trioxide, potassium bromate, and the like may be used as the oxidant. Among the various oxidants, ammonium persulfate may be preferable because it can inhibit dishing or erosion generated by unnecessary removal of the part of the target layer such as a copper wiring layer that needs not to be polished or removed in the progress of CMP.

The oxidant may be comprised in the slurry for CMP in the content of about 0.1 to 10 wt %, preferably about 0.1 to 5 wt %. If the content of the oxidant is too low, the polishing rate to the target layer may decrease, and if the content of the oxidant is too high, the property of the copper wiring layer may be deteriorated because the surface of the target layer may be excessively oxidized or corroded and sectional corrosions may remain on the finally polished target layer such as the copper wiring layer.

The slurry for CMP also comprises an organic acid. The organic acid forms a complex with a metallic substance such as copper of the target layer that is oxidized by the action of the oxidant to eliminate the copper ions, and improves the polishing rate to the target layer. Particularly, the chemical polishing by the interaction of the organic acid and the oxidant may be a main mechanism of polishing the target layer, when the target layer is a copper wiring layer.

As the organic acid, an amino acid, an amine-based compound, a carboxylic acid compound, and the like may unlimitedly be used. As specific examples of the organic acid, acidic compounds such as alanine, glycine, cystine, histidine, asparagine, guanidine, hydrazine, ethylene diamine, maleic acid, malic acid, tartaric acid, citric acid, malonic acid, phthalic acid, acetic acid, lactic acid, oxalic acid, pyridine carboxylic acid, pyridine dicarboxylic acid, quinaldic acid, or a salt thereof may be used. Among them, considering the reactivity to a target layer such as a copper wiring layer, glycine may be preferably used.

The organic acid may be comprised in the slurry for CMP in the content of about 0.05 to 2 wt %, preferably about 0.1 to 1.5 wt %, more preferably about 0.3 to 1.5 wt %. Within these contents, it is possible to reduce dishing or erosion generated on the surface of the target layer after polishing, while optimizing polishing speed to the target layer.

Furthermore, the slurry for CMP according to one embodiment of the invention may further comprise at least one polymeric additive selected from the group consisting of ethylene oxide-propylene oxide copolymer, polyethyleneglycol and polyoxyethylene ether. As results of experiments of the inventors, it was found that polishing properties comprising polishing rate and polishing selectivity of the slurry for CMP can be controlled by further comprising the polymeric additive in addition to the polyolefin-polyalkyleneoxide copolymer.

In case the slurry for according to the above-explained embodiments comprises as a polymeric additive polyolefin-polyalkyleneoxide copolymer comprising two or more polyalkyleneoxide repeat units, at least one polyalkyleneoxide repeat unit being branched, alone, or further comprises the above-explained polymeric additives, the polymeric additive may be comprised in the slurry for CMP in the content of about 0.001 to 1 wt %, and preferably about 0.01 to 0.5 wt %, more preferably about 0.05 to 0.4 wt %. As explained, due to the inclusion of the polymeric additive in a slurry for CMP, the slurry for CMP can be easily dispersed and penetrated within a wafer. Thus, if a CMP process is performed using the slurry for CMP, it is possible to inhibit dishing generated by unnecessary removal of a target layer such as a copper wiring layer at the edge of wafer, and to manufacture semiconductor devices showing more improved properties.

Furthermore, the slurry for CMP may further comprise DBSA (dodecylbenzenesulfonic acid), DSA (dodecyl sulfate), or a salt thereof to increase the solubility of the polymeric additive.

Furthermore, the slurry for CMP according to one embodiment of the invention may further comprise a corrosion inhibitor, a pH control agent, or a mixture thereof in addition to the constituents disclosed above.

The corrosion inhibitor is a constituent added for preventing dishing and the like by inhibiting severe chemical attack of the organic acid, etc. to a target layer at the dug parts thereof.

As the corrosion inhibitor, common materials those have been used to the slurry for CMP as the corrosion inhibitor may be used without limitation, and an azole-based compound such as benzotriazole (BTA), 4,4'-dipyridyl ethane, 3,5-pyrazole dicarboxylic acid, quinaldic acid, or a salt thereof may be used for example. More preferably, 4,4'-dipyridyl ethane, 3,5-pyrazole dicarboxylic acid, or quinaldic acid may be used, and thereby, dishing or erosion may be more effectively inhibited in the progress of CMP, and deterioration of polishing rate to the target layer caused by the corrosion inhibitor may be reduced.

Furthermore, the corrosion inhibitor may be comprised in the slurry for CMP in the content of about 0.001 to 2 wt %, and preferably about 0.01 to 1 wt %, more preferably about 0.01 to 0.7 wt %. Thereby, the deterioration of the polishing rate caused by the corrosion inhibitor may be reduced, and dishing caused by the chemical attack of the organic acid may be effectively reduced.

In addition, the slurry for CMP may further comprise a pH control agent to control the pH of the slurry adequately. As the pH control agent, at least one basic pH control agent such as potassium hydroxide, sodium hydroxide, aqueous ammonia, rubidium hydroxide, cesium hydroxide, sodium hydrogen carbonate, and sodium carbonate; or at least one acidic pH control agent selected from the group consisting of hydrochloric acid, nitric acid, sulfuric acid, phosphoric acid, formic acid, and acetic acid may be used, and the slurry may be diluted with a deionized water in order to prevent the coagulation of the slurry caused by a local pH variation when using a strong acid or a strong base.

Considering appropriate pH of the slurry to be controlled, one skilled in the art may use the pH control agent with an appropriate content.

Furthermore, the slurry for CMP may be in the form of an aqueous slurry similarly to a common slurry for CMP. Thus, it may further comprise water or an aqueous solvent as a solvent for dissolving or dispersing the constituents disclosed above in the remaining content.

The above explained slurry for CMP has excellent polishing rate to a target layer such as a copper wiring layer, and to the contrary, low polishing rate to a tantalum-containing layer that is used as a polishing stop layer when polishing the copper wiring layer or a silicon oxide layer that is used as an insulating layer of a semiconductor device, thus showing very high polishing selectivity to the target layer against the polishing stop layer or insulating layer. For example, according to the experiment results of the inventors, the slurry for CMP has excellent polishing rate to a copper layer of about 3000 Å/min or more or about 4000 Å/min or more, and it has excellent polishing selectivity of polishing rates between the copper layer:the tantalum-containing layer of about 30:1 or more, and polishing rates between the copper layer:the silicon oxide layer of about 50:1 or more. And, the surface roughness of the copper-containing layer polished using the slurry for CMP is less than 10 Å.

Therefore, when the above slurry for CMP is used for CMP of a copper wiring layer of a semiconductor device, a target, i.e., a copper wiring layer on a polishing stop layer can be rapidly and selectively polished and removed to planarize it.

Accordingly, if the slurry for CMP is used for CMP of a copper wiring layer of a semiconductor device, the target of the copper wiring layer can be uniformly and effectively polished and removed over the whole wafer, and thus the polished copper wiring layer may exhibit excellent uniformity and properties. Particularly, unnecessary removal of the copper wiring layer at the edge of the wafer may be inhibited to largely reduce dishing or erosion, particularly dishing of the copper wiring layer polished by the CMP.

Therefore, the slurry for CMP can be preferably used to polish or planarize a target layer such as a copper wiring layer of a semiconductor device, or a polishing stop layer and a copper wiring layer on a substrate by CMP. The polishing stop layer may comprise a tantalum or titanium-containing layer.

Thus, according to another embodiment of the invention, a chemical mechanical polishing method (CMP method) of a copper-containing layer using the above explained slurry is provided. The method comprises contacting a polishing pad with a copper-containing layer on a substrate; and moving them relative to each other while providing the above explained slurry between the copper-containing layer on the substrate and the polishing pad to polish the copper-containing layer.

In the CMP method, the copper-containing layer may be a copper wiring layer of a semiconductor device, and a polishing stop layer comprising titanium or tantalum may be formed below the copper wiring layer. Furthermore, the polishing stop layer and the copper wiring layer may be formed on an insulating layer composed of a silicon oxide layer.

In polishing or planarizing the copper-containing layer such as the copper wiring layer by CMP method, a substrate on which the copper-containing layer is formed is positioned at the head part of a polishing device, and the copper-containing layer and a polishing pad are contacted and moved relatively (that is, rotating the substrate on which the copper-containing layer is formed, or rotating the polishing pad) while providing the above explained slurry therebetween with facing them each other. Thereby, a mechanical polishing by the friction of the abrasive comprised in the slurry or the polishing pad, and a chemical polishing by the other chemical constituents of the slurry occur simultaneously, and the copper-containing layer is polished, and the polishing or planarization of the copper-containing layer may be completed by polishing the copper-containing layer until an upper surface of the polishing stop layer is exposed. And, the surface roughness of the copper-containing layer polished according to said method is less than 10 Å.

Particularly, in the CMP method according to another embodiment of the invention as explained above, a CMP process of the copper-containing layer is conducted using the slurry for CMP according to one embodiment of the invention. Thereby, the copper-containing layer can be rapidly polished, excellent polishing selectivity between the copper wiring layer and the polishing stop layer comprising tantalum may be obtained, and the copper wiring layer can be polished or planarized more selectively and effectively while inhibiting damage to the insulation layer below the polishing stop layer. And, since the copper-containing layer polished by the CMP process can be polished or planarized more uniformly over the whole wafer, dishing or erosion of the copper-containing layer can be inhibited, and more excellent electrical properties or surface condition of the polished copper-containing layer can be obtained.

Therefore, it is possible to form a more reliable copper wiring layer of a semiconductor device more effectively by the above CMP method, and it can largely contribute to the manufacture of a high-performance semiconductor device.

The present invention is further explained in more detail with reference to the following examples. These examples, however, should not be interpreted as limiting the scope of the present invention in any manner.

Examples 1 to 9

Preparation of Slurrys for CMP

As shown in the following Table 1, a slurry for CMP, comprising an abrasive; an oxidant; an organic acid; and a polymeric additive comprising polyolefin-polyalkyleneoxide copolymer, wherein the polyolefin-polyalkyleneoxide copolymer comprises two or more polyalkyleneoxide repeat units, and at least one polyalkyleneoxide repeat unit being branched, was prepared.

The following materials were used as the constituents for preparing the slurrys for CMP of Examples.

As the polyolefin-polyalkyleneoxide copolymer, AB3-1, AB3-2, AB3-3, AB3-4, and AB3-5 (Mitsui Co.) wherein 3 polyalkyleneoxide repeat units with Mn of 200~2,000 and polyolefin with Mn of 500~1500 are copolymerized as the above Chemical Formula 2 were used. And, as the polyolefin-polyalkyleneoxide copolymer, AB2 (Mitsui Co.) wherein polyolefin with Mn of 500~1500 and 2 polyalkyleneoxide repeat units with Mn of 200~2000 are copolymerized as the above Chemical Formula 3 was selectively used. Further, polyalkyleneoxide repeat units of above AB2, AB3-1, AB3-2, AB3-3, AB3-4, AB3-5, AB4 were independently polyethyleneglycol or polyproplyeneoxide.

In addition to the polyolefin-polyalkyleneoxide copolymer, propylene oxide-ethylene oxide copolymer and/or polyethyleneglycol (Mw. 1000) (PEG in Table 1) were further used as the polymeric additive. In Table 1, L-64 represents propylene oxide-ethylene oxide copolymer (Mw. 3880) manufactured by BASF Co., F-88 represents propylene oxide-ethylene oxide copolymer (Mw. 11250) manufactured by BASF Co., and Random represents propylene oxide-ethylene oxide random copolymer (Mw. 2500) manufactured by Aldrich Co.

As the abrasive, PL-1 or PL-3L among the colloidal silica of Quartron PL series of Fuso Chemical Co. was used, and as the organic acid, glycine, phthalic acid, pyridine carboxylic acid, and quinaldic acid were used with the ratio described in Table 1. As the corrosion inhibitor, quinaldic acid or 4,4'-dipyridylethane (DPEA in Table 1) was used, and as the oxidant, ammonium persulfate (APS in Table 1) was used.

According to the compositions disclosed in the following Table 1, the slurrys for CMP of Examples 1 to 9 were prepared by the following method.

Firstly, the abrasive, the organic acid, the corrosion inhibitor, and the polymeric additive were introduced into a 1 L polypropylene bottle with the composition disclosed in Table 1, and an appropriate amount of deionized water was added thereto. The oxidant was finally introduced with the deionized water. And then, 500 ppm of dodecylbenzenesulfonic acid (DBSA) was added thereto, pH of the slurry was controlled using KOH as the pH control agent, and deionized water was further added to adjust the total weight of the composition 100%. The composition was agitated for 10 minutes at high speed to prepare slurrys for CMP of Examples 1 to 9.

TABLE 1

Compositions of Examples 1 to 9

| Examples | Composition of slurry | | | | | |
|---|---|---|---|---|---|---|
| | Abrasive (wt %) | Organic acid (wt %) | Corrosion inhibitor (wt %) | Oxidant (wt %) | Polymeric additive (wt %) | pH |
| 1 | silica(1.2) | glycine(0.5) | Quinaldic acid (0.3) | APS(2) | Random (0.05) AB3-1 (0.025) PEG (0.125) | 9.5 |
| 2 | silica(1.2) | gylcine(0.5) | Quinaldic acid (0.3) | APS(2) | L-64 (0.05) AB3-1 (0.025) PEG (0.125) | 9.5 |
| 3 | silica(1.5) | glycine(0.5) pyridine carboxylic aid(0.5) | Quinaldic acid (0.2) | APS(2) | L-64 (0.05) AB3-3(0.025) PEG (0.125) | 9.5 |
| 4 | silica(1.2) | glycine(1) | Quinaldic acid (0.3) | APS(2) | Random (0.05) AB3-3 (0.025) PEG (0.125) | 9.5 |

TABLE 1-continued

Compositions of Examples 1 to 9

Composition of slurry

| Examples | Abrasive (wt %) | Organic acid (wt %) | Corrosion inhibitor (wt %) | Oxidant (wt %) | Polymeric additive (wt %) | pH |
|---|---|---|---|---|---|---|
| 5 | silica(1.2) | glycine(0.5) pyridine carboxylic acid(0.5) | DPEA (0.15) | APS(2) | F-88 (0.05) AB3-3 (0.025) PEG (0.125) | 9 |
| 6 | silica(1.2) | glycine(0.5) | Quinaldic acid (0.3) | APS(2) | Random (0.05) AB3-4 (0.025) PEG (0.125) | 9.5 |
| 7 | silica(1.2) | glycine(0.5) phthalic acid(0.4) | DPEA (0.15) | APS(2) | L-64 (0.05) AB3-4 (0.025) PEG (0.125) | 9.5 |
| 8 | silica(1.5) | glycine(0.5) pyridine carboxylic acid(0.5) | DPEA (0.15) | APS(2) | Random (0.05) AB3-5 (0.025) PEG (0.125) | 9.5 |
| 9 | silica(1.2) | glycine(1) quinaldic acid(0.3) | Quinaldic acid (0.3) | APS(2) | L-64 (0.05) AB2 (0.025) PEG (0.125) | 9.5 |

* In the composition of Table 1, the remaining content except the content of each constituent disclosed in Table 1, and the contents of dodecylbenzenesulfonic acid (DBSA) and the pH control agent not disclosed in Table 1 is water.

Comparative Examples 1 to 5

Preparation of Slurrys for CMP

The slurrys for CMP were prepared by the same method as the Examples, except that the kinds and contents of the abrasive, the oxidant, the organic acid and the polymeric additive were changed as described in the following Table 2. In the polymeric additives disclosed in Table 2, BRIJ-76 represents polyethyleneglycol stearyl ether (Mw. 711) manufactured by Aldrich Co., and BRIJ-58 represents polyethyleneglycol stearyl ether (Mw. 1124) manufactured by Aldrich Co.

TABLE 2

Compositions of Comparative Examples 1 to 5

Composition of slurry

| Comparative Examples | Abrasive (wt %) | Organic acid (wt %) | Corrosion inhibitor (wt %) | Oxidant (wt %) | Polymeric additive (wt) | pH |
|---|---|---|---|---|---|---|
| 1 | silica(1.2) | glycine(0.5) pyridine carboxylic acid(0.5) | DPEA (0.15) | APS(2) | BRIJ-76 (0.2) | 9.5 |
| 2 | silica(1.2) | glycine(0.5) | Quinaldic acid (0.3) | APS(2) | L-64 (0.05) BRIJ-76 (0.025) PEG (0.125) | 9.5 |
| 3 | silica(1.2) | glycine(0.5) pyridine carboxylic acid(0.5) | Quinaldic acid (0.2) | APS(2) | L-64 (0.05) BRIJ-58 (0.025) PEG (0.125) | 9.5 |
| 4 | silica(1.2) | glycine(1) | Quinaldic acid (0.3) | APS(2) | random(0.05) BRIJ-58 (0.025) PEG (0.125) | 9.5 |
| 5 | silica(1.2) | glycine(0.5) pyridine carboxylic acid(0.5) | DPEA (0.15) | APS(2) | F-88(0.05) BRIJ-58 (0.025) PEG (0.125) | 9 |

* In Table 2, DPEA represents 4,4'-dipyridyl ethane, APS repesents ammonium persulfate, and PEG represents polyethyleneglycol.

Experimental Example

Evaluation of Polishing Properties of Slurrys for CMP

Experimental Example 1

Evaluation of Etching Speed

A wafer on which a copper layer of 1500 nm was deposited by EP (Electro Plating) was cut in the size of 2×2 cm$^2$, and the pieces of the wafer were dipped into 30 ml of each slurry of Examples and Comparative Examples for 30 minutes. The etching speed (Å/min) of the copper layer by the slurry was calculated by converting the weight change of the wafer before and after dipping into the etched amount of the copper, and the results are shown in the following Tables 3 and 4.

After the evaluation of the etching speed, AFM analysis was conducted on the wafers of the Examples and Comparative Examples, and the results are shown in the following Tables 3 and 4. For the copper surface conditions, ⊚ represents very good (Cu surface roughness of less than 10 Å), ○ represents good (Cu surface roughness of 10 Å or more and less than 20 Å), Δ represents average (Cu surface roughness of 20 Å or more and less than 40 Å), × represents bad ((Cu surface roughness of 40 Å or more).

Experimental Example 2

Evaluation of Polishing Speed

The wafers were polished using the slurrys for CMP of Examples and Comparative Examples for 1 minute. And then, the thicknesses of the copper layer, the tantalum layer, and the silicon oxide layer before and after polishing were measured, and the polishing rates (polishing speed: Å/min) of the slurry to the copper layer, the tantalum layer, and the silicon oxide layer were calculated from the measured thickness. Also, the polishing selectivity of the slurry between the copper layer and the other layers (the polishing selectivity to the copper layer against the tantalum layer or the polishing selectivity to the copper layer against the silicon oxide layer) were calculated from the polishing rates to each layer. The polishing rates and the polishing selectivity to each layer were shown in Tables 3 and 4.

[Polishing Condition]
Polishing device: POLI-500 (GnP Co.)
Polishing pad: IC1000/SubaIV Stacked (Rodel Co.)
Platen speed: 93 rpm
Carrier speed: 87 rpm
Pressure: 1.5 psi
Flow rate of the slurry: 200 ml/min

[Target Layer]
8 inches wafer on which 15000 Å copper layer is deposited by Electroplating
8 inches wafer on which 3000 Å tantalum layer is deposited by PVD
8 inches wafer on which 7000 Å $SiO_2$ layer is deposited by PETEOS
MIT854 pattern wafer Measuring Method of the Thickness of Each Layer:
The thicknesses of the metal layer was calculated according to the following Formula, after measuring the sheet resistance of each layer with LEI1510 Rs Mapping (LEI Co.).

[Thickness of the copper layer (Å)]=[specific resistance of the copper layer($\Omega$/cm)÷sheet resistance ($\Omega$/square(□))]×$10^8$

[Thickness of the tantalum layer (Å)]=[specific resistance of the tantalum layer($\Omega$/cm)÷sheet resistance($\Omega$/square(□))]×$10^8$ The thickness of TEOS was measured with a Nanospec 6100 device (Nanometeics Co.).

TABLE 3

Evaluation results of polishing properties using the slurrys of Examples 1 to 9

| Example | Copper layer etching speed (Å/min) | Polishing rate(Å/min) | | | Polishing selectivity | | Surface roughness of copper layer (Å) | Surface condition of copper layer |
| --- | --- | --- | --- | --- | --- | --- | --- | --- |
| | | Copper layer | Tantalum layer | Silicon oxide layer | Copper layer: Tantalum layer | Copper layer: Silicon oxide layer | | |
| 1 | <10 | 5852 | 155 | 51 | 38:1 | 115:1 | <10 | ⊚ |
| 2 | <10 | 5763 | 168 | 46 | 34:1 | 125:1 | <10 | ⊚ |
| 3 | <10 | 5950 | 128 | 38 | 46:1 | 157:1 | <10 | ⊚ |
| 4 | <10 | 5810 | 162 | 44 | 36:1 | 132:1 | <10 | ⊚ |
| 5 | <10 | 5805 | 165 | 48 | 35:1 | 121:1 | <10 | ⊚ |
| 6 | <10 | 5945 | 140 | 43 | 42:1 | 138:1 | <10 | ⊚ |
| 7 | <10 | 6024 | 120 | 39 | 50:1 | 154:1 | <10 | ⊚ |
| 8 | <10 | 5801 | 160 | 43 | 36:1 | 135:1 | <10 | ⊚ |
| 9 | <10 | 5780 | 155 | 43 | 37:1 | 134:1 | <10 | ⊚ |

TABLE 4

Evaluation results of polishing properties using the slurrys of Comparative Examples 1 to 5

| Comparative Example | Copper layer etching speed (Å/min) | Polishing rate(Å/min) | | | Polishing selectivity | | Surface roughness of copper layer (Å) | Surface condition of copper layer |
| --- | --- | --- | --- | --- | --- | --- | --- | --- |
| | | Copper layer | Tantalum layer | Silicon oxide layer | Copper layer: Tantalum layer | Copper layer: Silicon oxide layer | | |
| 1 | 46 | 5520 | 80 | 25 | 69:1 | 221:1 | 26 | Δ |
| 2 | 10 | 6008 | 28 | 14 | 215:1 | 429:1 | <10 | ⊚ |
| 3 | 280 | 7800 | 58 | 19 | 134:1 | 411:1 | 56 | X |
| 4 | 24 | 7254 | 162 | 18 | 45:1 | 403:1 | 13 | ○ |
| 5 | 45 | 6020 | 148 | 35 | 41:1 | 172:1 | 34 | Δ |

Experimental Example 3

Evaluation of Pattern Polishing

In order to test the degree of dishing in the wafer polished by the slurrys of Examples and Comparative Examples, polishing test was conducted on a pattern wafer. Polishing test was conducted on wafers polished by the slurrys of Examples 2, 4, 5 and Comparative Examples 2 and 4, respectively, and the results are shown in the following Table 5. The measured line width are indicated by line width μm and line spacing μm. Hereinafter, the line width is indicated by (line width/line spacing) except the unit. Among the measured line width, (50/50), (90/10), (100/100) were selected. As the measuring device, VEECO Dektak 8 Surface Profiler was used. The profiles of the wafers polished using the compositions of Example 4 and Comparative Example 2 measured by VEECO Dektak 8 Surface Profiler are respectively shown in FIG. 1 and FIG. 2.

TABLE 5

| | Dishing(nm) Line width/Line spacing | | | | | | | | |
|---|---|---|---|---|---|---|---|---|---|
| | 90/10 | | | 50/50 | | | 100/100 | | |
| Wafer position | Center | Middle | Edge | Center | Middle | Edge | Center | Middle | Edge |
| Comparative Example 2 | 162 | 219 | 268 | 50 | 81 | 166 | 165 | 166 | 230 |
| Comparative Example 4 | 163 | 225 | 312 | 50 | 81 | 166 | 167 | 167 | 247 |
| Comparative Example 5 | 220 | 280 | 350 | 150 | 185 | 213 | 258 | 305 | 380 |
| Example 2 | 37 | 57 | 65 | <10 | <10 | <10 | 12 | 16 | 20 |
| Example 4 | 27 | 26 | 31 | <10 | <10 | <10 | 10 | 15 | 11 |
| Example 5 | 67 | 96 | 120 | 28 | 30 | 63 | 35 | 30 | 125 |

The experiment results (Tables 3 to 5) shows that when a polymeric additive of a polyolefin-polyalkyleneoxide copolymer comprising two or more polyalkyleneoxide repeat units, at least one polyalkyleneoxide repeat unit being branched, is comprised in a slurry for CMP (Examples 1 to 5), excellent polishing rate can be obtained and dishing to the target layer can be minimized. Specifically, when the slurrys for CMP of the Examples are used, polishing rate to the copper layer is good as about 5000 Å/min or more, and, the polishing rates between the copper layer:tantalum layer is about 30:1 or more, and the polishing rates between the copper layer:silicon oxide layer is about 50:1 or more. It is also shown that when the slurrys of the Examples are used for polishing, surface condition of the target layer can be maintained excellent, and dishing on the target layer can be minimized.

Figure 1:
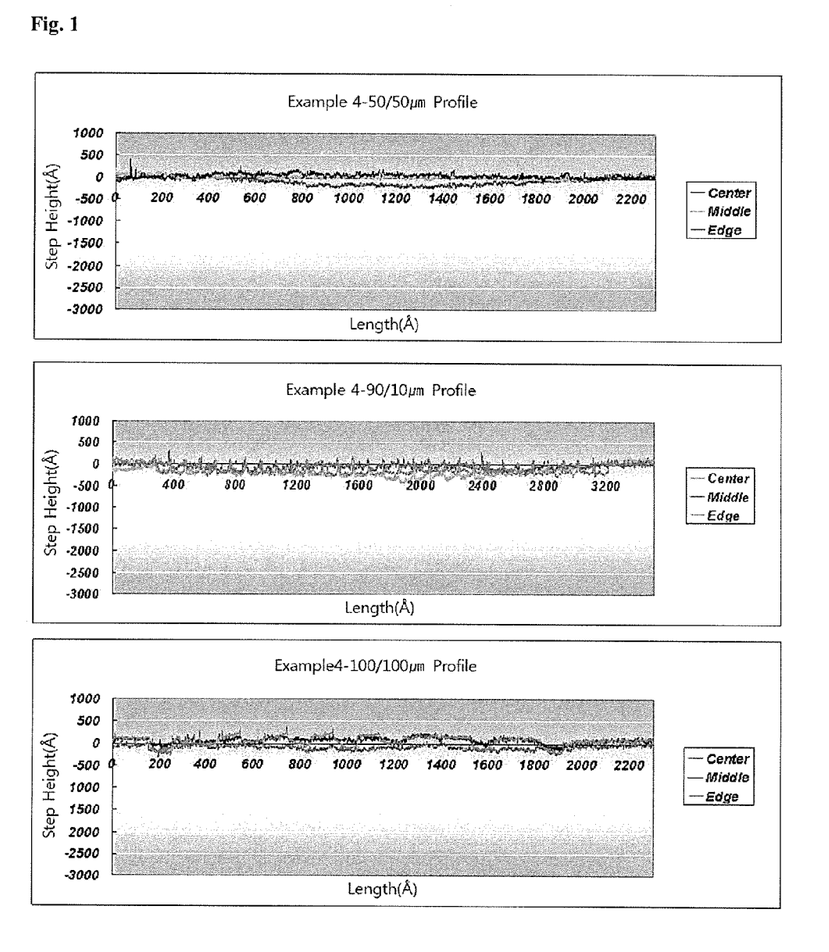
FIG. 1 shows a profile of a wafer polished using a slurry for CMP according to Example 4 of the invention.
Figure 2:
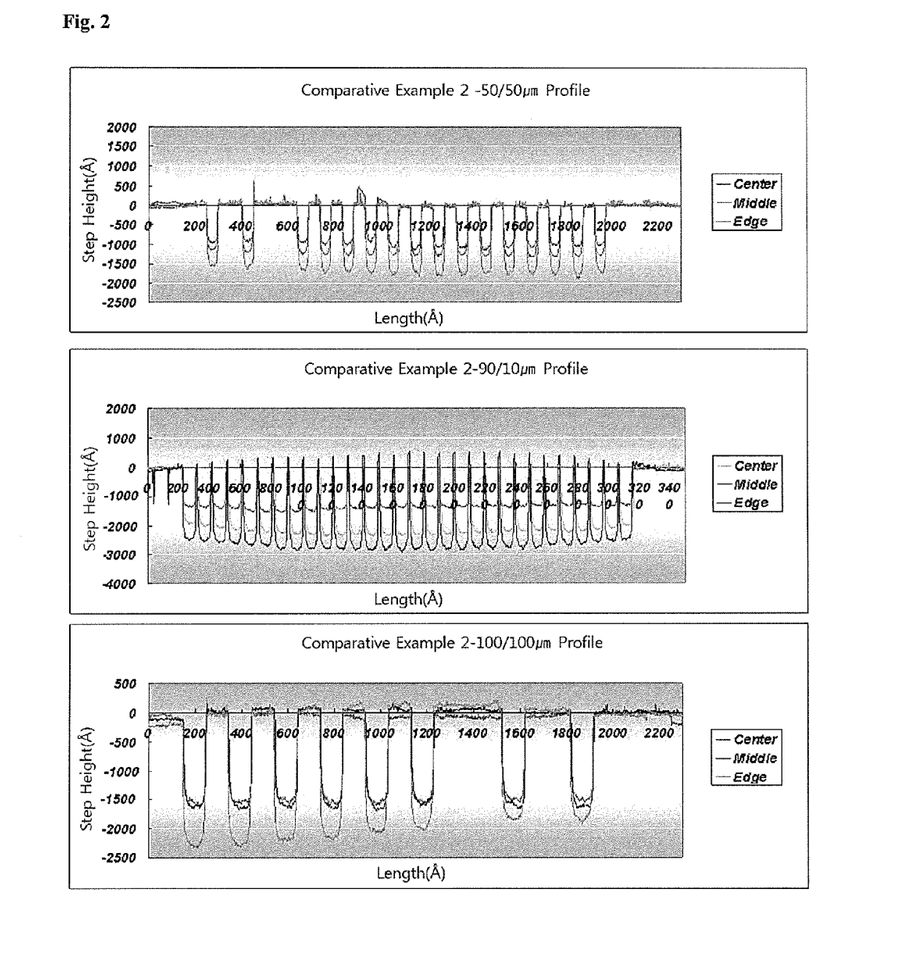
FIG. 2 shows a profile of a wafer polished using a slurry for CMP according to Comparative Example 2.

On the contrary, it is confirmed that when the slurrys of the Comparative Examples 1 to 5 are used for polishing, a lot of overpolishing to the target layer (copper layer), i.e., dishing are generated, and surface condition of the target layer becomes significantly rough and bad. Specifically, the polishing rates between the copper layer:tantalum layer and the polishing rates between the copper layer:silicon oxide layer are too high, and dishing of the copper layer comprising a copper wiring layer occurred excessively, As shown in the Table 5, on the surface of the wafer polished by the slurry of Comparative Examples, polishing amount to the copper wiring layer is too large and dishing is observed minimum 2 times or more, maximum 30 times or more compared to Examples. FIG. 1 and FIG. 2 show that a lot of dishing occurred when the slurrys of Comparative Examples are used for polishing, while dishing is minimized when the slurrys of Examples are used for polishing. Thus, it is expected that if the slurrys of Comparative Examples 1 to 5 are used for polishing, overpolishing and excessive removal of the copper layer may occur to deteriorate electrical properties of the polished copper layer.

What is claimed is:

1. A slurry for chemical mechanical polishing, comprising an abrasive; an oxidant; an organic acid; and a polymeric additive comprising polyolefin-polyalkyleneoxide copolymer, wherein the polyolefin-polyalkyleneoxide copolymer is represented by the following Chemical Formula 1, Chemical Formula 2, or Chemical Formula 3:

Chemical Formula 1

-continued

Chemical Formula 2

Chemical Formula 3 wherein, $R_1$, $R_2$, $R_{11}$, $R_{12}$, $R_{19}$, and $R_{20}$ are independently H or methyl; one of $R_3$ and $R_4$ is H, and the other is H or methyl; one of $R_5$ and $R_6$ is H, and the other is H or methyl; one of $R_7$ and $R_8$ is H, and the other is H or methyl; one of $R_9$ and $R_{10}$ is H, and the other is H or methyl; one of $R_{13}$ and $R_{14}$ is H, and the other is H or methyl; one of $R_{15}$ and $R_{16}$ is H, and the other is H or methyl; one of $R_{17}$ and $R_{18}$ is H, and the other is H or methyl; one of $R_{21}$ and $R_{22}$ is H, and the other is H or methyl; one of $R_{23}$ and $R_{24}$ is H, and the other is H or methyl; l, l', and l'' are independently an integer of from 4 to 100; m, m' and m'' are independently an integer of from 4 to 250; n, n' and n'' are independently are an integer of from 4 to 250; o and o' are independently an integer of from 4 to 250; and p is an integer of from 4 to 250.

2. The slurry for chemical mechanical polishing according to claim 1, the polyolefin repeat unit is a polyethylene repeat unit or a polyethylene-propylene copolymer repeat unit with molecular weight of 100 to 2,000.

3. The slurry for chemical mechanical polishing according to claim 1, wherein the abrasive comprises at least one of inorganic abrasive or resin based abrasive selected from the group consisting of a silica abrasive, an alumina abrasive, a ceria abrasive, a zirconia abrasive, a titania abrasive, a styrene-based polymer abrasive, an acryl-based polymer abrasive, a polyvinylchloride abrasive, a polyamide abrasive, a polycarbonate abrasive, and a polyimide abrasive.

4. The slurry for chemical mechanical polishing according to claim 1, wherein the abrasive has an average diameter of 10 to 500 nm.

5. The slurry for chemical mechanical polishing according to claim 1, wherein the oxidant comprises at least one selected from the group consisting of hydrogen peroxide, peracetic acid, perbenzoic acid, tert-butyl hydroperoxide, ammonium persulfate (APS), potassium persulfate (KPS), hypochlorous acid, potassium permanganate, iron nitrate, potassium ferricyanide, potassium periodate, sodium hypochlorite, vanadium trioxide and potassium bromate.

6. The slurry for chemical mechanical polishing according to claim 1, wherein the organic acid comprises at least one selected from the group consisting of alanine, glycine, cystine, histidine, asparagine, guanidine, hydrazine, ethylenediamine, maleic acid, malic acid, tartaric acid, citric acid, malonic acid, phthalic acid, acetic acid, lactic acid, oxalic acid, pyridinecarboxylic acid, pyridinedicarboxylic acid, quinaldic acid and a salt thereof.

7. The slurry for chemical mechanical polishing according to claim 1, wherein the polymeric additive further comprises at least one selected from the group consisting of ethylene oxide-propylene oxide copolymer, polyethyleneglycol, and polyoxyethylene ether.

8. The slurry for chemical mechanical polishing according to claim 1, wherein the composition has a polishing selectivity of the polishing rates between a copper-containing layer:a tantalum-containing layer of 30:1 or more.

9. The slurry for chemical mechanical polishing according to claim 1, wherein the composition has a polishing selectivity of the polishing rates between a copper-containing layer:a silicon-containing layer of 50:1 or more.

10. The slurry for chemical mechanical polishing according to claim 1, further comprising a corrosion inhibitor, a pH control agent or a mixture thereof.

11. The slurry for chemical mechanical polishing according to claim 10, wherein the corrosion inhibitor comprises at least one selected from the group consisting of benzotriazole, 4,4'-dipyridylethane, 3,5-pyrazole dicarboxylic acid, quinaldic acid and a salt thereof.

12. The slurry for chemical mechanical polishing according to claim 10, wherein the pH control agent comprises at least one basic pH control agent selected from the group consisting of potassium hydroxide, sodium hydroxide, aqueous ammonia, rubidium hydroxide, cesium hydroxide, sodium hydrogen carbonate and sodium carbonate; or at least one acidic pH control agent selected from the group consisting of hydrochloric acid, nitric acid, sulfuric acid, phosphoric acid, formic acid and acetic acid.

13. The slurry for chemical mechanical polishing according to claim 10, comprising 0.1 to 30 wt % of the abrasive, 0.1 to 10 wt % of the oxidant, 0.05 to 2 wt % of the organic acid, 0.001 to 2 wt % of the corrosion inhibitor, 0.001 to 1 wt % of the polymeric additive, and remaining amount of the pH control agent and water, based on the total weight of the composition.

14. The slurry for chemical mechanical polishing according to claim 1, wherein the composition is used for chemical mechanical polishing of a copper-containing layer.

15. The slurry for chemical mechanical polishing according to claim 14, wherein the copper-containing film comprises a copper wiring layer of a semiconductor device.

16. The slurry for chemical mechanical polishing according to claim 14, wherein the copper-containing layer comprises a polishing stop layer and a copper wiring layer on a substrate.

17. The slurry for chemical mechanical polishing according to claim 16, wherein the polishing stop layer comprises tantalum or titanium-containing film.

18. A chemical mechanical polishing method, comprising:
contacting a polishing pad with a copper-containing layer on a substrate; and
moving them relative to each other while providing the slurry of claim 1 between the copper-containing layer on the substrate and the polishing pad to polish the copper-containing layer.

19. The method according to claim 18, wherein the copper-containing layer comprises a polishing stop layer and a copper wiring layer on the substrate, and the polishing to the copper-containing layer is performed until an upper surface of the polishing stop layer is exposed.

20. The method according to claim 18, which enables the surface roughness of the copper-containing layer polished by the method to be less than 10 Å.

* * * * *